(12) United States Patent
Circlaeys et al.

(10) Patent No.: US 9,489,104 B2
(45) Date of Patent: Nov. 8, 2016

(54) VIEWABLE FRAME IDENTIFICATION

(71) Applicant: Apple Inc., Cupertino, CA (US)

(72) Inventors: Eric Circlaeys, Paris (FR); Kjell Bronder, San Francisco, CA (US); Ralf Weber, San Jose, CA (US)

(73) Assignee: Apple Inc., Cupertino, CA (US)

( * ) Notice: Subject to any disclaimer, the term of this patent is extended or adjusted under 35 U.S.C. 154(b) by 334 days.

(21) Appl. No.: 14/080,591

(22) Filed: Nov. 14, 2013

(65) Prior Publication Data
US 2015/0135134 A1    May 14, 2015

(51) Int. Cl.
*G06F 3/0481* (2013.01)

(52) U.S. Cl.
CPC .................... *G06F 3/0481* (2013.01)

(58) Field of Classification Search
CPC .................................................. G06F 3/0481
See application file for complete search history.

(56) References Cited

U.S. PATENT DOCUMENTS

| | | | |
|---|---|---|---|
| 4,969,204 A | 11/1990 | Jones |
| 5,263,136 A | 11/1993 | DeAguiar |
| 5,532,716 A | 7/1996 | Sano |
| 5,880,739 A | 3/1999 | Collins |
| 6,141,446 A | 10/2000 | Boliek |
| 6,208,762 B1 | 3/2001 | Garland |
| 6,307,559 B1 | 10/2001 | Hancock |
| 6,411,302 B1 | 6/2002 | Chiraz |
| 6,496,980 B1 | 12/2002 | Tillman |
| 6,636,215 B1 | 10/2003 | Greene |
| 6,741,864 B2 | 5/2004 | Wilcock |
| 6,924,814 B1 | 8/2005 | Ephanov |
| 7,426,696 B1 | 9/2008 | Hwang |
| 7,751,596 B2 | 7/2010 | Rhoads |
| 7,808,514 B2 | 10/2010 | Yu |
| 8,001,143 B1 | 8/2011 | Gupta |
| 8,234,558 B2 | 7/2012 | Swift |
| 8,577,911 B1 | 11/2013 | Stepinski |
| 8,655,885 B1 | 2/2014 | Scott |
| 8,713,530 B2 | 4/2014 | Waite |
| 8,867,849 B1 | 10/2014 | Kirkham |
| 2002/0026507 A1 | 2/2002 | Sears |
| 2002/0107973 A1 | 8/2002 | Lennon |
| 2002/0152226 A1 | 10/2002 | Burnett |
| 2003/0018607 A1 | 1/2003 | Lennon |

(Continued)

OTHER PUBLICATIONS

Bechtolsheim et al., "High-Performance Raster Graphics for Microcomputer Systems," 1980, Computer Systems Laboratory, Stanford University, ACM.

(Continued)

*Primary Examiner* — Anil Bhargava
(74) *Attorney, Agent, or Firm* — Blank Rome LLP (57) ABSTRACT

A set of media items may be matched with a media arrangement that displays the media items in the set in a group of frames. The media arrangement may extend across an area larger than a viewable area of a display device. In order to determine the media items that appear within a viewable area, a list of media items may be divided into two portions, one on either side of a middle item in the list. If any part of a frame with which the middle item is associated is within an extended spatial area that extends beyond the viewable area, the middle item may be eliminated from the list, when no part of the frame with which the middle item is associated is within the extended area. The process may be repeated until it is determined that a part of a frame with which the middle item is associated is within the extended area.

20 Claims, 6 Drawing Sheets

(56) References Cited

U.S. PATENT DOCUMENTS

| | | |
|---|---|---|
| 2003/0128210 A1 | 7/2003 | Muffler |
| 2003/0147097 A1* | 8/2003 | Kotani .................. G06K 15/00 358/1.18 |
| 2003/0167257 A1 | 9/2003 | deBonet |
| 2003/0177197 A1 | 9/2003 | deBonet |
| 2003/0188016 A1 | 10/2003 | Agarwalla |
| 2003/0188021 A1 | 10/2003 | Challenger |
| 2004/0172495 A1 | 9/2004 | Gut |
| 2004/0240746 A1 | 12/2004 | Aliaga |
| 2005/0050043 A1 | 3/2005 | Pyhalammi |
| 2005/0071781 A1* | 3/2005 | Atkins .................. G06T 11/60 715/838 |
| 2005/0102473 A1 | 5/2005 | Sakata |
| 2005/0175251 A1 | 8/2005 | Taketa |
| 2005/0193083 A1 | 9/2005 | Han |
| 2005/0206658 A1 | 9/2005 | Fagans |
| 2006/0028659 A1* | 2/2006 | Nishikawa ............ G06K 15/02 358/1.2 |
| 2006/0064630 A1 | 3/2006 | Balinsky |
| 2006/0109343 A1 | 5/2006 | Watanabe |
| 2007/0050467 A1 | 3/2007 | Borrett |
| 2007/0074110 A1* | 3/2007 | Miksovsky ............ G06T 11/60 715/210 |
| 2007/0222865 A1 | 9/2007 | Levien |
| 2007/0223887 A1 | 9/2007 | Kanamori |
| 2007/0253479 A1 | 11/2007 | Mukherjee |
| 2008/0091526 A1 | 4/2008 | Shoemaker |
| 2008/0147974 A1 | 6/2008 | Madison |
| 2008/0162485 A1 | 7/2008 | Long |
| 2008/0181498 A1 | 7/2008 | Swenson |
| 2008/0292265 A1 | 11/2008 | Worthen |
| 2008/0313405 A1 | 12/2008 | Sakata |
| 2009/0083279 A1 | 3/2009 | Hasek |
| 2009/0244079 A1 | 10/2009 | Carson |
| 2009/0274366 A1 | 11/2009 | Iourcha |
| 2010/0046842 A1 | 2/2010 | Conwell |
| 2010/0095340 A1 | 4/2010 | Ei |
| 2010/0161582 A1 | 6/2010 | Spohr |
| 2010/0180234 A1* | 7/2010 | Szuszczewicz .... H04N 1/00132 715/838 |
| 2010/0274674 A1 | 10/2010 | Roberts |
| 2010/0329588 A1 | 12/2010 | Cheatle |
| 2011/0026593 A1 | 2/2011 | New |
| 2011/0026835 A1 | 2/2011 | Ptucha |
| 2011/0064301 A1 | 3/2011 | Sun |
| 2011/0179075 A1 | 7/2011 | Kikuchi |
| 2011/0202847 A1 | 8/2011 | Dimitrov |
| 2011/0212717 A1 | 9/2011 | Rhoads |
| 2011/0314202 A1 | 12/2011 | Iyigun |
| 2012/0072656 A1 | 3/2012 | Archak |
| 2012/0084276 A1 | 4/2012 | Heimendinger |
| 2012/0084343 A1 | 4/2012 | Mir |
| 2012/0092997 A1 | 4/2012 | Mihaly |
| 2012/0150651 A1 | 6/2012 | Hoffberg |
| 2012/0159558 A1 | 6/2012 | Whyte |
| 2012/0173824 A1 | 7/2012 | Iyigun |
| 2012/0191716 A1 | 7/2012 | Omoigui |
| 2012/0206498 A1 | 8/2012 | Kai |
| 2012/0210068 A1 | 8/2012 | Joshi |
| 2012/0233221 A1 | 9/2012 | Katari |
| 2012/0303575 A1 | 11/2012 | Crolene |
| 2013/0007667 A1 | 1/2013 | Sauve |
| 2013/0018875 A1 | 1/2013 | Qiao |
| 2013/0028508 A1 | 1/2013 | Perronnin |
| 2013/0050254 A1 | 2/2013 | Tran |
| 2013/0055081 A1 | 2/2013 | Limbasia |
| 2013/0159328 A1 | 6/2013 | McConnell |
| 2013/0173853 A1 | 7/2013 | Ungureanu |
| 2013/0194438 A1 | 8/2013 | Sweet |
| 2013/0218721 A1 | 8/2013 | Borhan |
| 2013/0311329 A1 | 11/2013 | Knudson |
| 2014/0015873 A1 | 1/2014 | Kasai |
| 2014/0063031 A1 | 3/2014 | Brasnett |
| 2014/0111545 A1 | 4/2014 | Damola |
| 2014/0112394 A1 | 4/2014 | Sullivan |
| 2014/0125685 A1 | 5/2014 | Yeh |
| 2014/0126841 A1 | 5/2014 | Wang |
| 2014/0140589 A1 | 5/2014 | Klotzer |
| 2014/0189487 A1 | 7/2014 | Kwan |
| 2014/0222560 A1 | 8/2014 | Kota |
| 2014/0270407 A1 | 9/2014 | Balakrishnan |
| 2014/0344705 A1 | 11/2014 | Dimitrov |
| 2014/0365905 A1 | 12/2014 | Chedeau |
| 2015/0019545 A1* | 1/2015 | Chedeau ............. G06F 17/3053 707/725 |
| 2015/0135069 A1 | 5/2015 | Circlaeys |
| 2015/0135134 A1 | 5/2015 | Circlaeys |
| 2015/0189107 A1 | 7/2015 | Murata |
| 2015/0254806 A1 | 9/2015 | Circlaeys |
| 2016/0034559 A1 | 2/2016 | Feyereisl |

OTHER PUBLICATIONS

Guthe et al., "Advanced Techniques for High-Quality Multi-Resolution Volume Rendering," 2004, Computers & Graphics 28, Elsevier.

Lindstrom et al., "On-the-Fly Decompression and Rendering of Multiresolution Terrain," 2010, Association for Computing Machinery, ACM.

Rauschenbach et al., "Demand-Driven Image Transmission with Levels of Detail and Regions of Interest," 1999, Computers & Graphics 23, Elsevier.

* cited by examiner

VIEWABLE FRAME IDENTIFICATION

BACKGROUND

This disclosure relates generally to techniques to display a group of media items in an optimal media arrangement. More particularly, the disclosure relates to techniques to efficiently identify a set of frames (and corresponding media items) within a visible display area of a displayed media arrangement.

With the rapid increase in the number of devices capable of capturing digital media and the number of repositories for such media, there exists a need for an interface that is capable of aggregating, sorting, and displaying all of the media to which a user has access in a visually pleasing manner. Unlike traditional media item displays which generally include display frames having a common size and repetitive spacing, a visually pleasing display of media items may include a more natural and random arrangement of media items in display frames having varying sizes and positioning. Due to the randomness in size and positioning of the display frames that contain media items in a visually pleasing arrangement, the identification of the display frames that appear within a viewable area may require a more complex operation than that required for traditional, ordered displays. In addition, because many of the devices capable of capturing and displaying media items in a more visually pleasing arrangement have relatively limited memory and processing capabilities (e.g., mobile devices such as phones, tablet computer systems, and personal digital assistants or PDAs), it would be desirable to optimize the operations to identify display frames that appear within a viewable area in order to improve a user's experience in viewing the media items.

SUMMARY

In one embodiment, a method is provided for associating each media item in a set of media items with a frame in a media arrangement and identifying one or more media items that are within a viewable area of the media arrangement. The method includes dividing a list of media items from the set of media items into two portions, one portion on either side of a middle item in the list and determining whether any part of a frame with which the middle item is associated is within an extended spatial area that extends beyond the viewable area of the media arrangement. The method also includes eliminating from the list the middle item and the portion that does not include any media items that are associated with frames that are within the extended area, when it is determined that no part of the frame with which the middle item is associated is within the extended area; repeating the dividing, determining, and eliminating until it is determined that a part of a frame with which the middle item is associated is within the extended area, and identifying one or more media items on either side of the middle item in the list that are associated with frames that are at least partially within the viewable area of the media arrangement.

In another embodiment, a non-transitory program storage device is provided which is readable by a processor and includes instructions that cause one or more processors to associate each media item in a set of media items with a frame in a media arrangement, divide a group of media items from the set of media items into two portions, one portion on either side of a middle item in the group, determine whether any part of a frame with which the middle item is associated is within a first spatial area of the media arrangement, modify the group of media items to include only the one of the two portions that includes one or more media items that are associated with frames within the first spatial area when it is determined that no part of the frame with which the middle item is associated is within the first spatial area, continue performing the instructions to divide, determine, and modify until it is determined that a part of a frame with which the middle item is associated is within the first spatial area, and identify one or more media items on either side of the middle item that are associated with frames that are at least partially within a second spatial area of the media arrangement.

DETAILED DESCRIPTION

This disclosure pertains to systems, methods, and computer readable media for displaying user-selected media items in a manner that optimizes the user experience. In general, a set of media items may be matched to, and displayed in accordance with, one of a number of predefined media arrangements as described in co-pending applications entitled "Semi-Automatic Organic Layout for Media Streams" and "Multi-Source Media Aggregation", both of which are being filed concurrently with this application and the contents of which are incorporated herein by reference. More specifically, different portions of a set of media items may be matched to different sub-media arrangements and the sub-media arrangements may be appended together in order to create the appearance of a single media arrangement (hereinafter referred to as the media arrangement) to display all of the media items in the set. Because the set of media items may include a large number of media items, it will be understood that only a subset of the media items will appear within a viewable portion of the media arrangement at any given time. As the user interacts with the display of the media items in the media arrangement (e.g., scrolls through the media items), it may be necessary to identify which portion of the media arrangement, and consequently which media items, are viewable at any given time. It may further be necessary that this identification occur in an efficient manner in order to maintain the interactive feel of the display interface.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of media item processing having the benefit of this disclosure.

Figure 1:
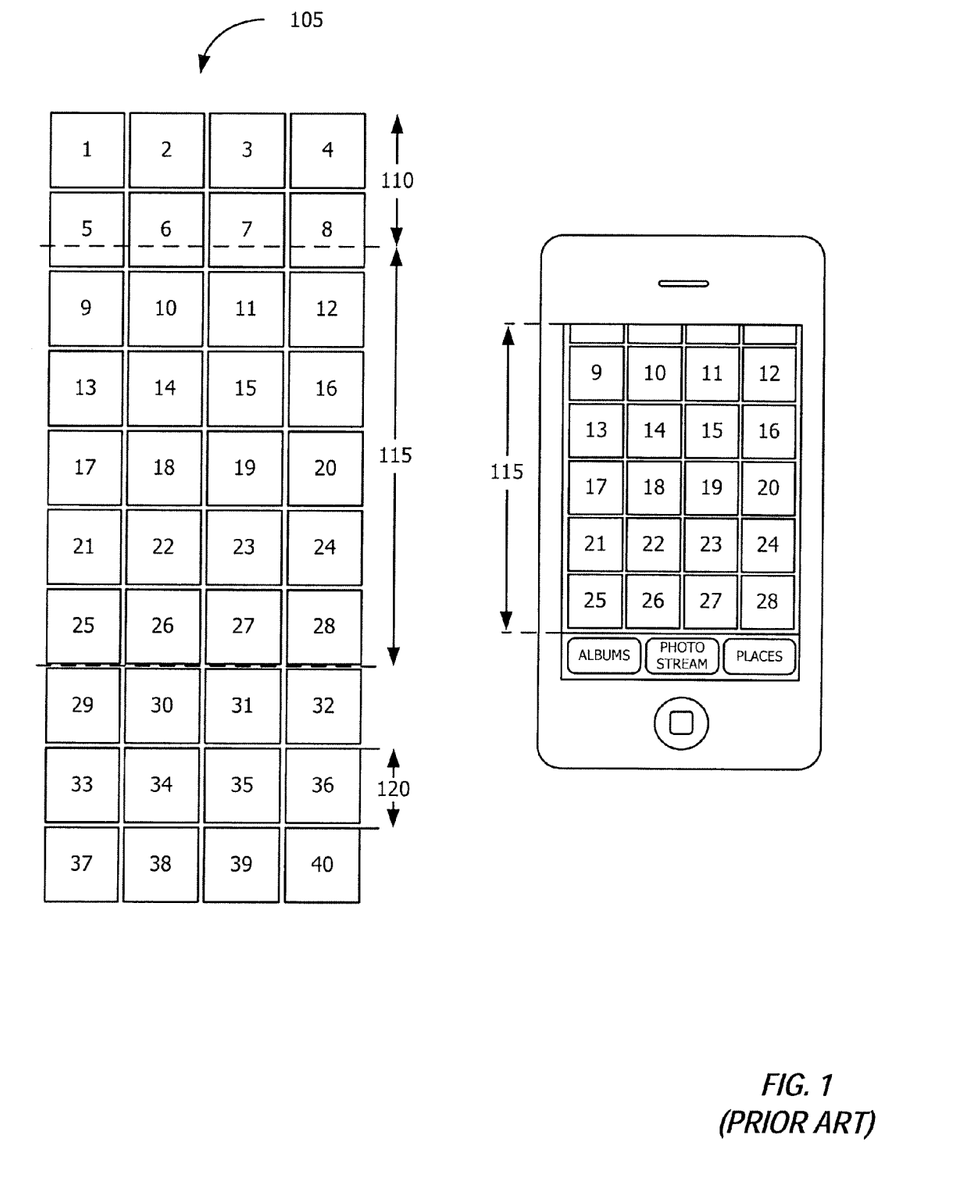
FIG. 1 illustrates a set of media items displayed in an ordered media arrangement and depicts a viewable area of the media arrangement in accordance with existing media item display interfaces.

Referring to FIG. 1, existing media item display interfaces typically display a set of media items according to an ordered arrangement 105 of media frames. That is, each media item may be displayed in a media frame having a common size and the media frames may be organized in an ordered pattern. The ordered pattern of the display enables the frames that appear within a viewable area of the display to be quickly determined as a user interacts with the display (e.g., scrolls through the display). For example, for a given pixel offset 110 (i.e., the offset from the beginning portion of the display), the viewable area may be determined to lie within an adjustment dimension range beginning at offset 110 and extending by a value equal to the display region size 115 in the adjustment dimension. Based on the known ordered pattern, the viewable area may be expressed in terms of media item spacing by dividing the beginning range value (i.e., offset 110) and the end range value (i.e., offset 110+ display region size 115) by the consistent spacing between media item frames. For example, in the illustrated embodiment, offset 110 may be 315 pixels, display region size 115 may be 910 pixels, and ordered arrangement 105 may have spacing 120 of 175 pixels. Using these values, the viewable area may be expressed in terms of media item spacing as having an adjustment dimension range beginning at 1.8 and ending at 7. Using these values, it can be determined that the viewable range includes at least a portion of media frames from the second row through the seventh row (i.e., frames 5-28). It will be understood that the illustrated ordered arrangement 105 and related viewable area determination is provided by way of example only. Similar techniques may be utilized to determine the media items that appear within a viewable area for any media arrangement having a consistent pattern.

Figure 2:
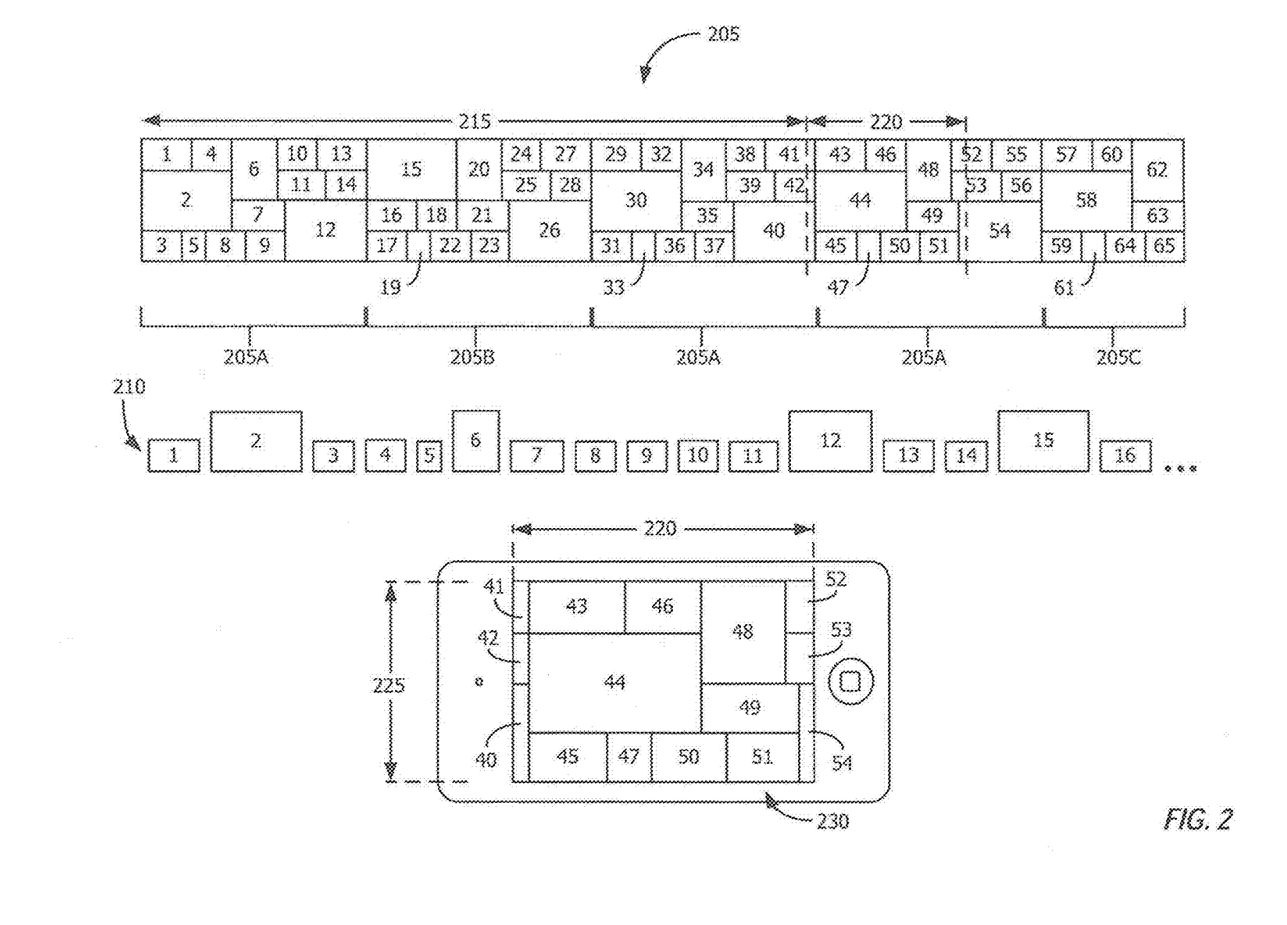
FIG. 2 illustrates a set of media items displayed in a visually pleasing media arrangement and depicts a viewable area of the media arrangement in accordance with one embodiment.

Referring to FIG. 2, in accordance with an embodiment of this disclosure, media items in media item set 210 may be arranged for display in media arrangement 205. More precisely, the properties of media items in different subsets of media item set 210 may be evaluated against the properties of predefined sub-media arrangements 205A, 205B, and 205C to identify an optimal or near optimal arrangement for each particular subset. The media items from media item set 210 may then be placed in the respective frames of the identified sub-media arrangement and the sub-media arrangements 205A-C may be appended to form media arrangement 205. It can be seen that the size and positioning of media frames within media arrangement 205 is not constant. Moreover, although the number of illustrated media items and media arrangements (205A-C) is limited for purposes of clarity, a typical media arrangement may include a larger number of different sub-media arrangements to accommodate a larger number of media items.

For a given offset 215 (i.e., the offset from a reference point for the initial display of media arrangement 205), the viewable area may be defined in terms of offset 215, display region size in the adjustment dimension 220 (i.e., the dimension of the media arrangement in which user adjustments of the viewable area are capable of being made), and display region size in the non-adjustment dimension 225. For example, for a display region size of 1024 pixels by 768 pixels and an offset of 4200 pixels, all or a portion of frames 40-54 of media arrangement 205 appear within viewable area 230. However, because the size and spacing of media frames varies within any particular region of media arrangement 205, the identification of media frames that appear within a viewable area corresponding to any particular offset is a more complex operation than for a display of media items in an ordered media arrangement.

Figure 3:
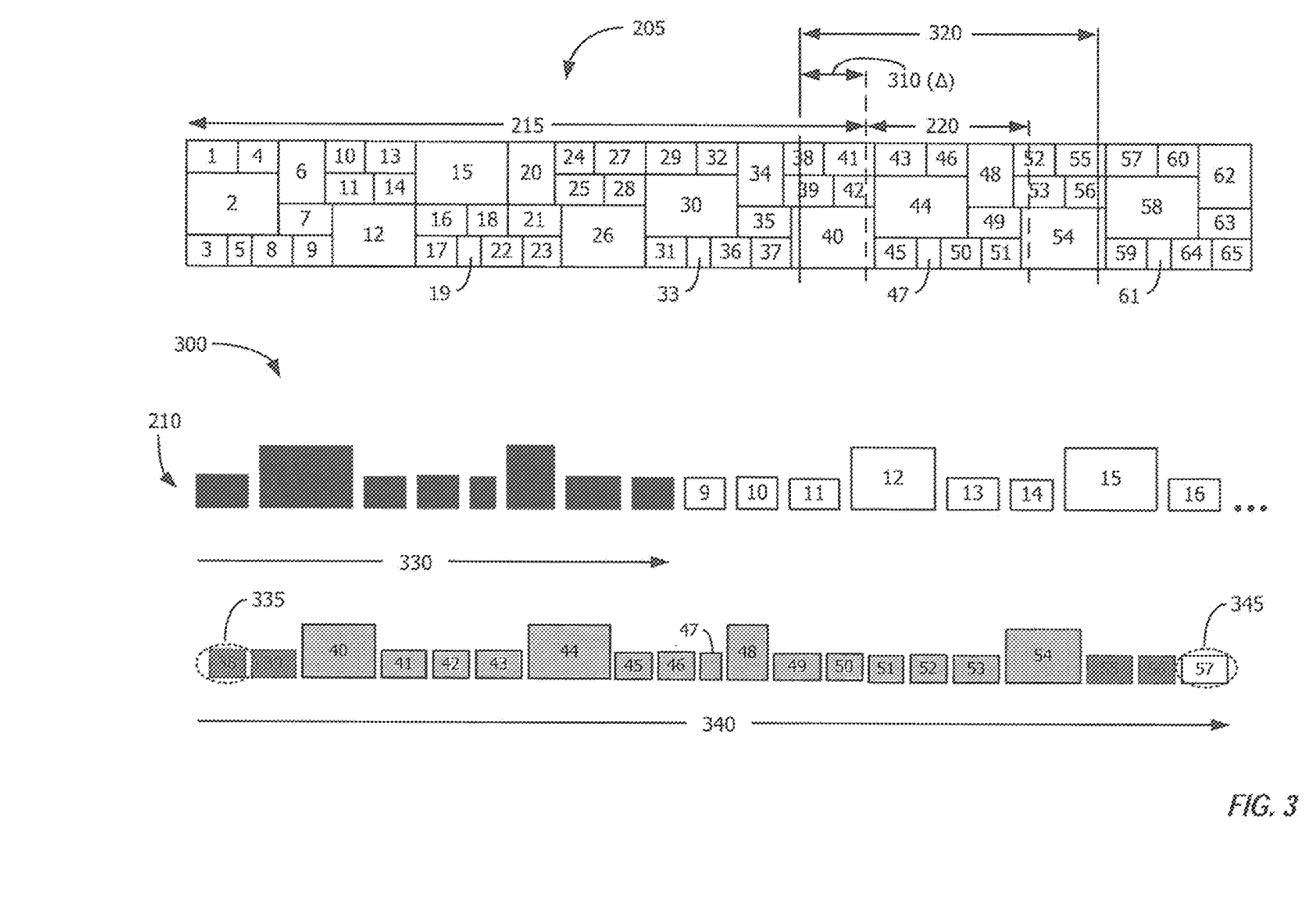
FIG. 3 illustrates a non-preferred operation to identify the frames of a media arrangement that are within a viewable area.

Referring to FIG. 3, a non-preferred operation for identifying the frames of media arrangement 205 includes proceeding through each item in media item set 210 to identify media items having corresponding frame dimensions that appear within known viewable area 230. As set forth above, for a given offset 215, viewable area 230 can be determined. The display offset may be continuously monitored by an application that incorporates visually pleasing displays such as media arrangement 205 so that the viewable area may be determinable at any time. In addition, when the media items in media item set 205 are matched with a particular frame in media arrangement 205, the media item may be associated with coordinates that define the region in which the frame appears in media arrangement 205. In one embodiment, the region in which a particular frame appears may be defined by the coordinate location of a corner of the frame as well as the length and width of the frame. For example, the first image in media item set 210 (which is assigned to frame 1) may be associated with display region [(0,0), (306, 204)]. In alternate embodiments, the region in which a frame appears may be defined in any other suitable manner that enables a determination of the frame's location with respect to a viewable area.

Because there is a relationship between the position of a media item within media item set 210 and the location of the corresponding frame of media arrangement 205 within which the media item is displayed (i.e., media items having a similar position in media item set 210 have a similar location in media arrangement 205), it may be possible to proceed through media item set 210 one item at a time to identify a group of media items that appear within a particular region without evaluating each and every media item in media item set 210. However, because consecutive media items in media item set 210 may not have adjacent locations within media arrangement 205, it may be necessary to account for the largest positional difference in the adjustment dimension between consecutive media items in media item set 210. For example, a particular viewable area may include at least a portion of media item 36 but none of media items 34 or 35. In order to ensure that the iterative process can be concluded (i.e., that all media items that appear within a particular region have been identified), it may be necessary to expand the region against which each media item's corresponding frame coordinates are evaluated to include the largest positional difference in the adjustment dimension between consecutive media items in media item set 210. In the illustrated embodiment, display region 220 is expanded in each direction by an amount ($\Delta$) 310 that is equal to the maximum positional difference in the adjustment dimension between consecutive media items in media item set 210 to obtain expanded region 320. In one embodiment, viewable area 230 and the expanded area defined by expanded region 320 may be labeled as R1 and R2, respectively. R1 and R2 may be defined by the coordinate location of a corner of each respective area as well as the length and width of the area. For example, for an offset 215 of 4200 pixels and a display region size of 1024 pixels by 768 pixels, R1 may be defined as [(4200, 0), (1024, 768)] and R2 may be defined as [(4200−$\Delta$, 0), (1024+$\Delta$, 768)]. In an alternate embodiment, R1 and R2 may be defined in any manner that allows the areas to be compared to the locations of frames in media arrangement 205.

The maximum distance $\Delta$ may differ based on the placement of media items within media arrangement 205. If frames are positioned in media arrangement 205 such that the display of consecutive media items in media item set 210 is at least partially overlapping in the adjustment dimension, the maximum distance ($\Delta$) 310 may be equal to the adjustment dimension size of the largest frame in media arrangement 205. If frames are positioned in media arrangement 205 such that the frames within any particular sub-media arrangement (e.g., media arrangements 205A, 205B, and 205C) have no positional ordering (e.g., ordered based on importance), the maximum distance $\Delta$ may be equal to the adjustment dimension size of the largest sub-media arrangement. Alternatively, if frames are strictly ordered by position in the adjustment dimension (e.g., left to right with top to bottom priority for identical abscissa), the maximum distance $\Delta$ may be equal to zero.

Iterative operation 300 to identify the media items that are assigned to frames that appear within viewable area 230 (R1) may include sequentially evaluating the media items in media item set 210 to identify the first media item assigned to a frame having coordinates that intersect expanded area R2 (330). Upon identification of the first media item assigned to a frame that intersects R2 (335), each media item may be sequentially evaluated (340) for its assignment to a frame that intersects with both R1 and R2. Upon identification of the first media item that does not intersect with R2 (345), the iterative process may end and the media items assigned to frames that intersect with R1 (e.g., frames 40-54) may be determined to be at least partially within viewable area 230.

While iterative operation 300 may allow the media items that at least partially appear within viewable area 230 to be identified without evaluating every media item, the complexity of the operation increases linearly with increasing offset (i.e., O(n)). As the offset increases, the number of media items that need to be evaluated also increases and the performance suffers.

In one embodiment, in order to ensure a smooth user scrolling experience, it may be desired to maintain a relatively high frame rate (e.g., 60 frames per second) for displaying the media items in a media arrangement. In such an embodiment, it will obviously be necessary for operations to determine the media items that appear within a viewable area to be performed with at least the same frequency. Because the media items appearing within a visible area may need to be recalculated each time the display offset is adjusted (e.g., by a user scroll input) by even a single pixel, iterative operation 300 may not provide the necessary performance as the number of media items and the display offset increases. Accordingly, the efficiency of an operation to identify the media items that appear within a viewable area may need to be increased in order to attain the desired performance.

Figure 4:
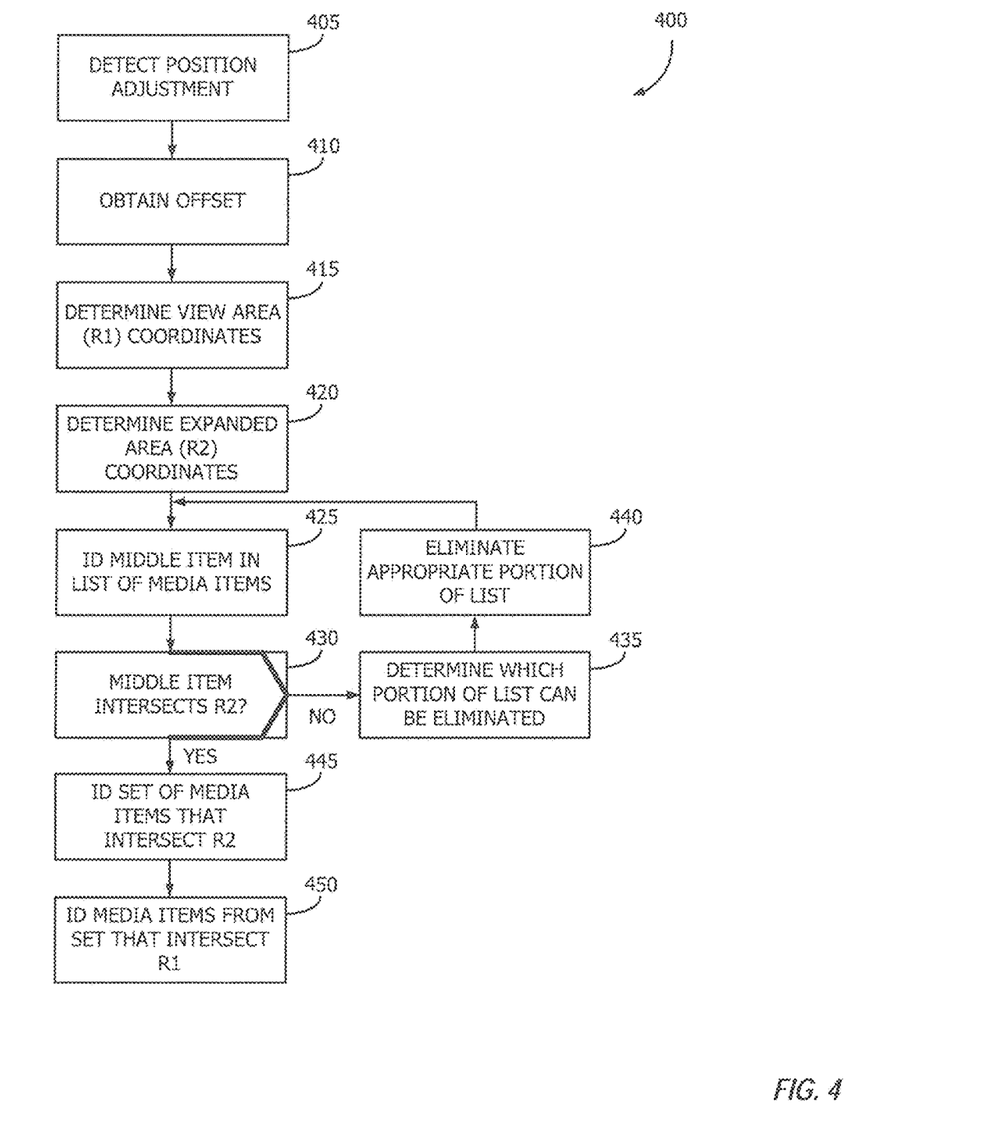
FIG. 4 is a flowchart that illustrates an efficient operation to identify the frames of a media arrangement that are within a viewable area in accordance with one embodiment.

Referring to FIG. 4, operation 400 to identify the media items that appear within a viewable area of a media arrangement may begin with an identification of a position adjustment (block 405). As described above, a user may interact with the display of media items in a media arrangement. For example, the user may use an input device to adjust (e.g., scroll) the viewable portion of a media arrangement, and, consequently, the visible media items. In one embodiment, a position adjustment may be based on a manual adjustment of the viewable portion of a media arrangement by a user. In another embodiment, a position adjustment may be based on an automatic adjustment of the viewable portion of a media arrangement. For example, an animation may cause a viewable portion of a media arrangement to be automatically adjusted.

In response to a detection of a position adjustment, the display offset may be obtained (block 410). In one embodiment, the offset may represent a distance between a known reference point and a corresponding reference point of a current viewable portion of the media arrangement. For example, as described above, the identified offset may represent the number of pixels between the left edge of the initial viewable portion (e.g., the viewable portion upon a first display of the media arrangement) and the left edge of the current viewable portion of the media arrangement. In another embodiment, the known reference point may be adjusted according to position adjustments. For example, the known reference point may be adjusted to correspond to a reference point of a prior viewable area (e.g., the left edge of the viewable area immediately prior to the user position adjustment). In response to a position adjustment, the current reference point may be compared to the known reference point to obtain the offset.

For a given offset, the coordinates of a viewable area may be determined based on the characteristics of the display (block 415). For example, the viewable area may be described by the coordinates of a rectangle having a height and width equal to the known properties of the display area at the determined offset. In one embodiment, the viewable area (R1) may be defined by a set of coordinates that represent the location of a corner of the viewable area (e.g., in a coordinate system defined with respect to the media arrangement) and a set of values that represent the height and width of the display area. In another embodiment, the viewable area (R1) may be defined in any manner that allows for the identification of frames that intersect the viewable area.

In addition to the determination of the coordinates of the viewable area (R1), the coordinates of an expanded area (R2) may also be determined (block 420). The expanded area (R2) may account for the potential positional differences between consecutive media items in a media item set by expanding the viewable area (R1) in each direction in the adjustment dimension by an amount ($\Delta$) equal to the largest possible positional difference in the adjustment dimension between consecutive media items. The amount ($\Delta$) by which the viewable area (R1) is expanded to obtain the expanded area (R2) may vary based on the positional ordering of media frames within the media arrangement as described above. Similar to operation 300, comparison of media frame locations to the expanded area (R2) may ensure that process 400 does not conclude without identifying one or more media items that are assigned to frames that should properly be identified as appearing within the viewable area (R1).

After the coordinates of the viewable area (R1) and the expanded area (R2) have been determined, the middle item in a list of media items that are included in the media arrangement may be identified (block 425). For a first iteration, the list of media items may include all of the media items in the media item set (ordered in the same manner as the media item set) that was matched with the media arrangement. As will be described below, for subsequent iterations, the list of media items may include less than all of the media items in the media item set. The middle item in the list of media items is determined based on the ordering of media items in the media item set used to populate the media arrangement. For example, for a list of media items having 37 media items, the $19^{th}$ media item may be identified as the middle item in the list. In one embodiment, the middle item in the list may be identified by dividing the number of items in the list by two, rounding the result if necessary (e.g., if the result is a non-integer value), and selecting the media item having an order in the list that corresponds to the result. However, the middle item may be identified in any manner that divides the media item list into portions having substantially similar numbers of media items.

After the middle media item in the list has been identified, it may be determined if the middle media item is assigned to a frame in the media arrangement that intersects with the expanded area (R2) (block 430). When each item in the media item set has been assigned to a frame in the media arrangement, the location properties of the frame to which each media item is assigned may be associated with the media items. In one embodiment, the location of the frame to which a media item is assigned may be expressed in terms of the same coordinate system used to define the location of the viewable area (R1) and the expanded area (R2). In such an embodiment, determining whether the media item is assigned to a frame that intersects with the expanded area (R2) may simply involve a comparison of the coordinates of the frame and the expanded area (R2) to identify an overlap.

If it is determined that the middle item in the list does not intersect with the expanded area (R2) (the "No" prong of block 430), the portion of the list that may be eliminated may be determined (block 435). Based on the comparison of the location of the frame to which the middle item is assigned and the location of the expanded area (R2) to determine whether there is an intersection, the portion of the list of media items that can be eliminated may also be determined. For example, because the list of media items substantially corresponds to the location of the media items within the media arrangement, if the middle item does not intersect with the expanded area (R2) then each of the media items in one of the two portions of the list will also not intersect with the expanded area (R2) and can therefore be eliminated from the list. If the comparison of the location of the frame to which the middle item is assigned and the location of the expanded area (R2) indicates that the media item is assigned to a frame located left of the expanded area, then all of the other items located left of the middle item will also be located left of the expanded area (R2). Therefore, for a list of media items having a substantially left to right positioning by order, the middle item and all of the items preceding the middle item in the list can be eliminated from the list. Conversely, if the middle item is determined to be located right of the expanded area (R2), for a list of media items having a substantially left to right positioning by order, the middle item and all of the media items after the middle item in the list can be eliminated from the list. Stated differently, the middle item divides the list of media items into two portions, and, if it is determined that the middle item is assigned to a frame that has a location that does not intersect with the location of the expanded area (R2), the middle item and all of the media items in one of the portions can be eliminated from the list. Based on the determination, the appropriate portion of the list may be eliminated (block 440), and the middle item in the modified list may be identified. It is important to note that, although a portion of the media items in the list may be eliminated, the remaining items maintain the initial ordering. The process of identifying a middle item in a list of media items, determining whether the media item is assigned to a frame having a location that intersects with the expanded region, and eliminating the appropriate media items from the list (i.e., blocks 425-440) may continue until it is determined that the identified middle item in the list is assigned to a frame that intersects with the expanded area (R2).

When it is determined that an identified middle item in the list intersects with the expanded area (the "Yes" prong of block 430), the set of media items around the identified middle media item that are also assigned to frames that intersect with the expanded area (R2) may be identified (block 445). In one embodiment, identifying the set of media items that are also assigned to frames that intersect with the expanded area (R2) may include proceeding through the list of media items sequentially in each direction from the middle media item until the first media item in each direction from the middle media item that is assigned to a frame that does not intersect with the expanded area (R2) is identified. The media items between these two items (i.e., between the first item in each direction of the middle media item that is assigned to a frame that does not intersect with the expanded area), may be identified as the complete set of media items that are assigned to frames that intersect with the expanded area.

From the set of media items assigned to frames that intersect with the expanded region, it may be determined which media items are assigned to frames that also intersect with the viewable area (R1) (block 450). While the identification of media items assigned to frames that intersect with the viewable area (R1) is illustrated as being performed after the identification of media items assigned to frames that intersect with the expanded area (R2), in one embodiment, these operations may actually be performed simultaneously. For example, when the frame locations of the media items in each direction of the middle media item are compared to the expanded area (R2), they may also be compared to the viewable area (R1). The set of media items assigned to frames that intersect with the viewable area (R1) may be identified as the complete set of media items that are at least partially contained within the viewable area.

Operation 400 has a complexity that is a logarithmic function of the number of items in the media item set (i.e., $O(\log_2 n)$). Whereas doubling the offset in operation 300 results in doubling the number of media items that must be evaluated, doubling the number of media items (for any given offset) only adds a single comparison measure in accordance with operation 400.

Figure 5:
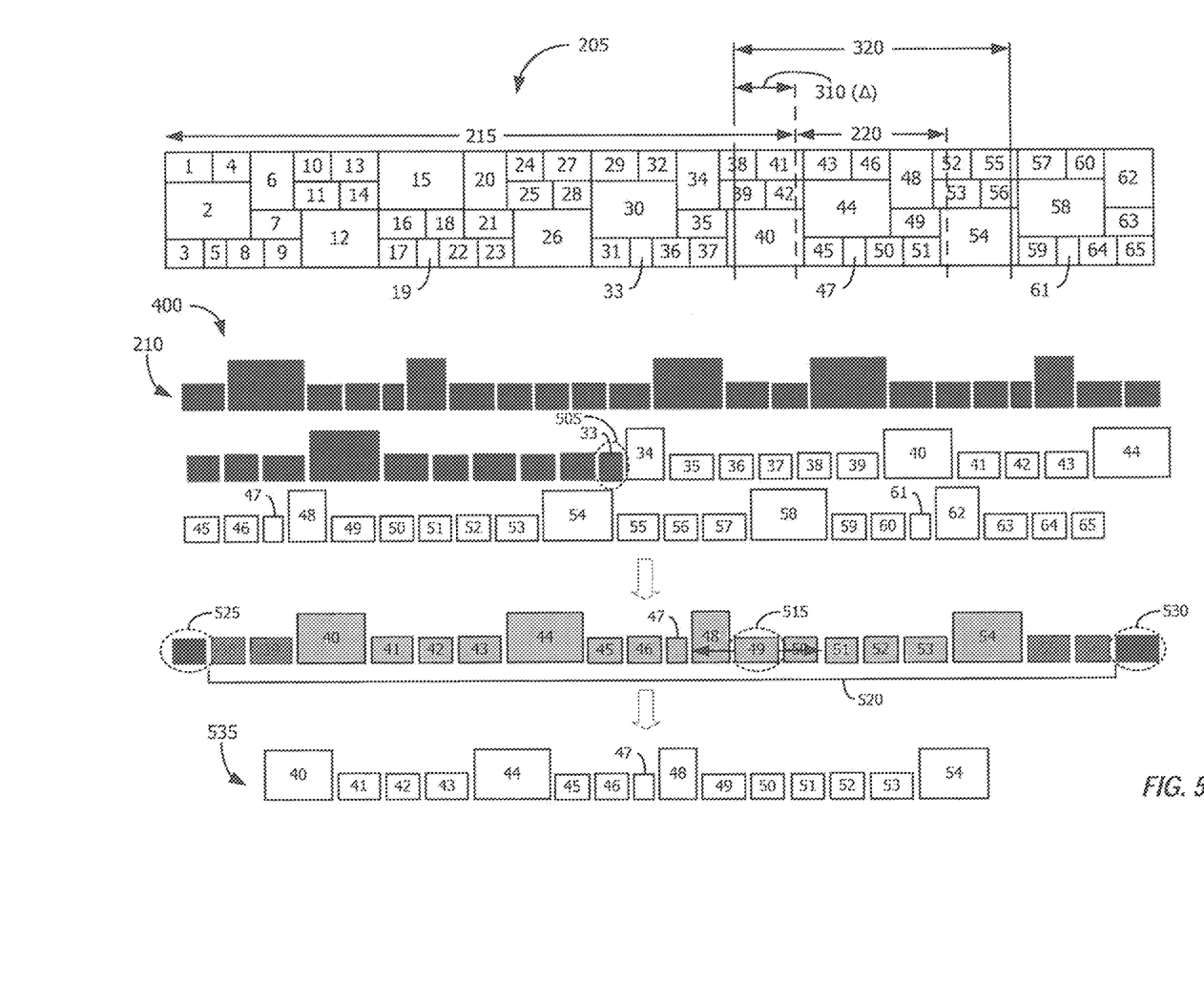
FIG. 5 graphically illustrates the efficient viewable frame identification operation of FIG. 4 in accordance with one embodiment.

Referring to FIG. 5, operation 400 is illustrated in block diagram form. Based on the number of media items in media item set 210, the $33^{rd}$ media item may be identified as middle item 505 in the list of media items. It may then be determined that middle item 505 is assigned to a frame that does not intersect with the expanded area (R2) (as indicated by expanded region 320). It may also be determined that the frame to which middle item 505 is assigned is located left of the expanded area (R2) and that all of the items that precede middle item 505 in the list of media items can be eliminated from the list.

Using the modified list of media items (that includes 32 media items), the $16^{th}$ item in the modified list (the $49^{th}$ item in media item set 210) may be identified as the middle item (515). It may then be determined that middle item 515 is assigned to a frame that does intersect with the expanded area. The set of media items that are assigned to frames that intersect with the expanded area (520) may then be identified by sequentially evaluating the media items on either side of middle item 515 for assignment to a frame that intersects with the expanded area until the first media item in each direction of middle item 515 that is assigned to a frame that does not intersect with the expanded area is identified (i.e., media items 525 and 530). From within the set of media items 520, the media items 535 that are assigned to frames that intersect with the viewable area are identified. These media items represent the complete set of media items that are at least partially visible within the viewable area and for which media item data is required for a current display.

Figure 6:
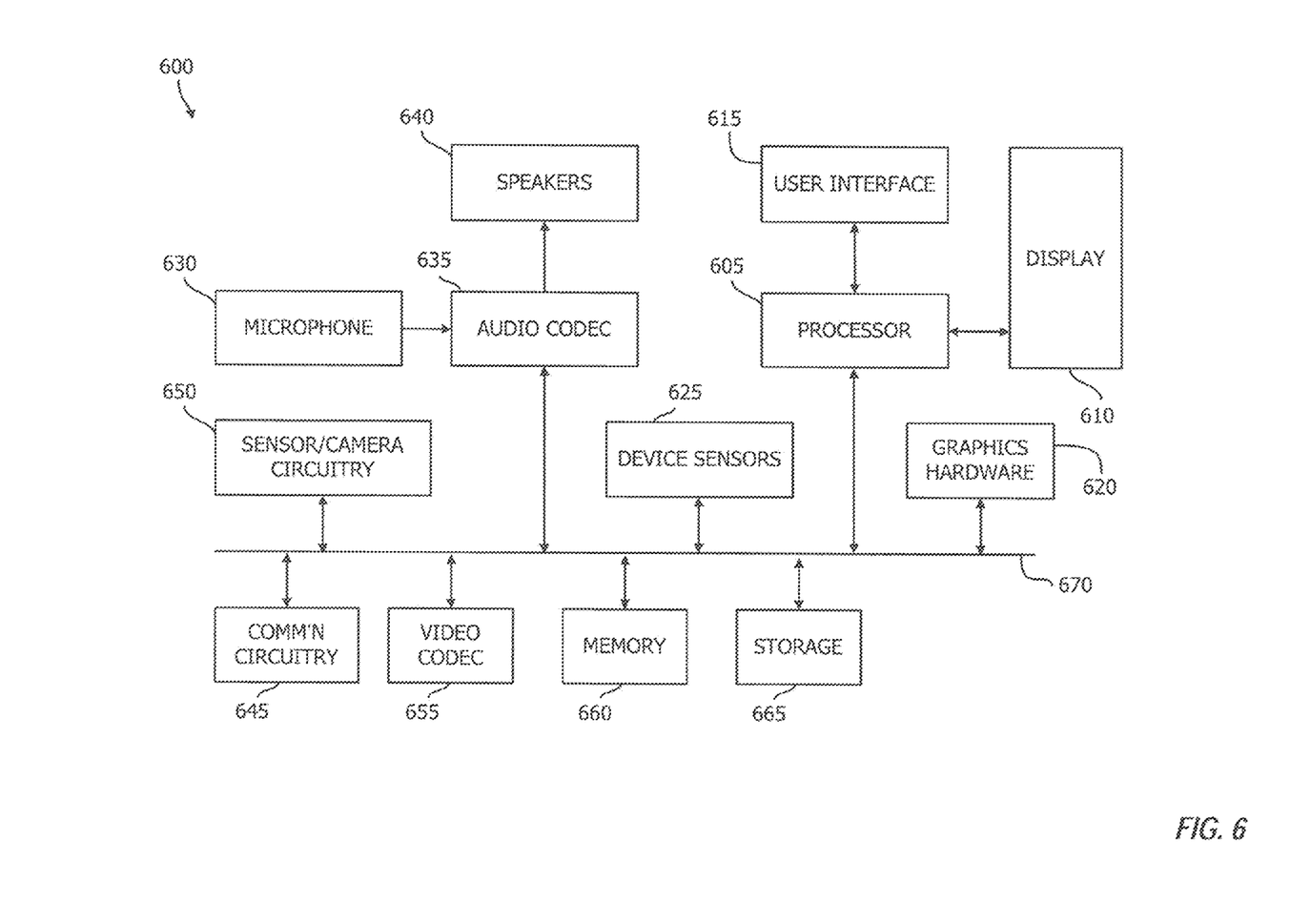
FIG. 6 illustrates an illustrative electronic device in accordance with one embodiment.

Referring to FIG. 6, a simplified functional block diagram of illustrative electronic device 600 is shown according to one embodiment. Electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650, video codec(s) 655, memory 660, storage 665, and communications bus 670. Electronic device 600 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 600.

Processor 605 may execute instructions necessary to carry out or control the operation of many functions performed by device 600. Processor 605 may, for instance, drive display 610 and receive user input from user interface 615. User interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable graphics processing unit (GPU).

Sensor and camera circuitry 650 may capture still and video images that may be processed, at least in part, in accordance with the disclosed techniques by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may also be used to tangibly retain computer program instructions or code organized into one or more modules and written in any desired computer programming language. When executed by, for example, processor 605 such computer program code may implement one or more of the operations described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause one or more processors to:
    associate each media item in a set of media items with a frame in a media arrangement;
    divide a group of media items from the set of media items into two portions, one portion on either side of a middle item in the group;
    determine whether any part of a frame with which the middle item is associated is within a first spatial area of the media arrangement;
    modify the group of media items to include only the one of the two portions that includes one or more media items that are associated with frames within the first spatial area when it is determined that no part of the frame with which the middle item is associated is within the first spatial area;
    continue performing the instructions to divide, determine, and modify until it is determined that a part of a frame with which the middle item is associated is within the first spatial area; and
    identify one or more media items on either side of the middle item that are associated with frames that are at least partially within a second spatial area of the media arrangement.

2. The non-transitory program storage device of claim 1, wherein the second spatial area is a viewable area of the media arrangement.

3. The non-transitory program storage device of claim 2, further comprising instructions to cause the one or more processors to identify a user adjustment of the viewable area of the media arrangement.

4. The non-transitory program storage device of claim 3, wherein the instructions to cause the one or more processors to divide, determine, modify, continue, and identify are performed in response to an identification of a user adjustment of the viewable area of the media arrangement.

5. The non-transitory program storage device of claim 1, wherein the first spatial area extends outside of the second spatial area in each direction in an adjustment dimension of the media arrangement.

6. The non-transitory program storage device of claim 5, further comprising instructions to identify a maximum positional difference in the adjustment dimension between consecutive media items in the set of media items.

7. The non-transitory program storage device of claim 6, wherein the first spatial area extends outside of the second spatial area in each direction in the adjustment dimension by an amount equal to the identified maximum positional difference.

8. The non-transitory program storage device of claim 6, wherein the maximum positional difference is equal to the largest adjustment dimension size of a frame in the media arrangement.

9. The non-transitory program storage device of claim 6, wherein the maximum positional difference is equal to the adjustment dimension size of a largest sub-media arrangement in the media arrangement.

10. The non-transitory program storage device of claim 1, wherein the instructions to cause the one or more processors to determine whether any part of a frame with which the middle item is associated is within a first spatial area of the media arrangement comprise instructions to cause the one or more processors to:
    identify an offset of the second spatial area from a reference point;
    determine the coordinates of the second spatial area at the identified offset;
    determine the coordinates of the first spatial area based, at least in part, on the coordinates of the second spatial area; and
    determine whether the frame with which the middle item is associated intersects with the first spatial area based, at least in part, on the coordinates of the first spatial area.

11. The non-transitory program storage device of claim 1, wherein the instructions to cause the one or more processors identify one or more media items on either side of the middle item that are associated with frames that are at least partially within a second spatial area of the media arrangement comprise instructions to cause the one or more processors to:
    identify a second set of media items that are associated with frames that are at least partially within the first spatial area; and
    identify, from the second set of media items, one or more media items that are associated with frames that are at least partially within the second spatial area.

12. The non-transitory program storage device of claim 11, wherein the instructions to cause the one or more processors to identify a second set of media items that are associated with frames that are at least partially within the first spatial area comprise instructions to cause the one or more processors to:
    sequentially evaluate the media items in the group in a first direction from the middle item until a first media item that is associated with a frame that does not intersect with the first spatial area is identified;
    sequentially evaluate the media items in the group in a second direction from the middle item until a second media item that is associated with a frame that does not intersect with the first spatial area is identified;
    identify the media items between the first and second media items in the group as the second set of media items that are associated with frames that are at least partially within the first spatial area.

13. A method comprising:
    associating each media item in a set of media items with a frame in a media arrangement; and
    identifying one or more media items that are within a viewable area of the media arrangement by:
    dividing a list of media items from the set of media items into two portions, one portion on either side of a middle item in the list;
    determining whether any part of a frame with which the middle item is associated is within an extended spatial area that extends beyond the viewable area of the media arrangement;
    eliminating from the list the middle item and the portion that does not include any media items that are associated with frames that are within the extended area when it is determined that no part of the frame with which the middle item is associated is within the extended area;
    repeating the dividing, determining, and eliminating until it is determined that a part of a frame with which the middle item is associated is within the extended area; and
    identifying one or more media items on either side of the middle item in the list that are associated with frames that are at least partially within the viewable area of the media arrangement.

14. The method of claim 13, further comprising identifying a user adjustment of the viewable area of the media arrangement.

15. The method of claim 14, wherein the acts of dividing, determining, eliminating, and repeating are performed in response to an identification of a user adjustment of the viewable area of the media arrangement.

16. The method of claim 13, wherein the act of determining whether any part of a frame with which the middle item is associated is within the extended area comprises:
    identifying a positional offset between the viewable area and a reference point;
    determining coordinates of the viewable area and the extended area based, at least in part, on the identified positional offset; and
    comparing coordinates of the frame with which the middle item is associated with the coordinates of the extended area.

17. The method of claim 13, wherein the act of identifying one or more media items on either side of the middle item in the list that are associated with frames that are at least partially within the viewable area of the media arrangement comprises:
    identifying the first media item in the list on each side of the middle item that is associated with a frame that does not intersect with the extended area;
    defining a second set of media items that includes the media items in the list between the identified first media items on each side of the middle item; and
    identifying the one or more media items that are associated with frames that are at least partially within the viewable area of the media arrangement from within the second set of media items.

18. A system, comprising:
    a memory;
    a display device; and a processor operatively coupled to the memory and the display device and adapted to execute program code stored in the memory to:

associate each media item in a set of media items with a frame in a media arrangement;

divide a list of media items from the set of media items into two portions, one portion on either side of a middle item in the list;

determine whether any part of a frame with which the middle item is associated is within an extended spatial area of the media arrangement that extends beyond an area of the media arrangement that is viewable on the display device;

eliminate from the list the middle item and the portion that does not include any media items that are associated with frames that are within the extended area when it is determined that no part of the frame with which the middle item is associated is within the extended area;

continue to execute the program code to divide, determine, and eliminate until it is determined that a part of a frame with which the middle item is associated is within the extended area; and identify one or more media items on either side of the middle item in the list that are associated with frames that are at least partially within the area of the media arrangement that is viewable on the display device.

19. The system of claim 18, wherein the program code to cause the one or more processors to identify the one or more media items comprises program code to cause the one or more processors to:

sequentially evaluate each media item in the list in a first direction from the middle item until a media item associated with a frame that does not intersect with the extended area is identified;

sequentially evaluate each media item in the list in a second direction from the middle item until a media item associated with a frame that does not intersect with the extended area is identified;

assign the media items between the identified media items that are not assigned to frames that intersect with the extended area to a second set of media items; and identify the one or more media items that are at least partially within the area of the media arrangement that is viewable on the display device from the second set of media items.

20. The system of claim 19, wherein the extended area extends beyond the area of the media arrangement that is viewable on the display device in each direction in an adjustment dimension of the media arrangement by an amount that is greater than or equal to a maximum positional difference in the adjustment dimension between two consecutive media items in the set of media items.

* * * * *